(12) United States Patent
Tsurugai et al.

(10) Patent No.: US 6,451,419 B1
(45) Date of Patent: Sep. 17, 2002

(54) SHOCK ABSORBING MATERIAL

(75) Inventors: Kazuo Tsurugai; Hisao Tokoro, both of Utsunomiya (JP)

(73) Assignee: JSP Corporation, Tokyo (JP)

( * ) Notice: Subject to any disclaimer, the term of this patent is extended or adjusted under 35 U.S.C. 154(b) by 0 days.

(21) Appl. No.: 09/242,337

(22) PCT Filed: Aug. 8, 1997

(86) PCT No.: PCT/JP97/02792
§ 371 (c)(1),
(2), (4) Date: Feb. 11, 1999

(87) PCT Pub. No.: WO98/06777
PCT Pub. Date: Feb. 19, 1998

(30) Foreign Application Priority Data

Aug. 12, 1996 (JP) ............................................. 8-229289

(51) Int. Cl.⁷ ................................................. B32B 3/00
(52) U.S. Cl. ..................... 428/304.4; 526/160; 526/161; 526/351; 526/943
(58) Field of Search ....................... 428/304.4; 526/351, 526/943, 160, 161

(56) References Cited

U.S. PATENT DOCUMENTS

| | | | |
|---|---|---|---|
| 4,379,859 A | 4/1983 | Hirosawa et al. | |
| 4,436,840 A | 3/1984 | Akiyama et al. | |
| 4,440,703 A | 4/1984 | Akiyama et al. | |
| 4,443,393 A | 4/1984 | Akiyama et al. | |
| 4,464,484 A | 8/1984 | Yoshimura et al. | |

(List continued on next page.)

FOREIGN PATENT DOCUMENTS

| | | | |
|---|---|---|---|
| EP | 0068467 | | 1/1983 |
| EP | 0071981 | | 2/1983 |
| EP | 0123144 | | 10/1984 |
| EP | 0263989 | | 4/1988 |
| JP | 52047580 | | 4/1977 |
| JP | 88024618 B | * | 3/1988 |
| JP | 4071624 | | 3/1992 |
| JP | 06240041 A | * | 8/1994 |
| JP | 94059694 B2 | * | 8/1994 |
| JP | 7265865 | | 10/1995 |
| JP | 8150326 | | 6/1996 |

OTHER PUBLICATIONS

Abstract of Japanese Laid–Open Patent Application No. 7–258455 (Oct. 9, 1995).
Abstract of Japanese Laid–Open Patent Application No. 5–179049 (Jul. 20, 1993).
Abstract of Japanese Laid–Open Patent Application No. 8–20662 (Jan. 23, 1996).

*Primary Examiner*—Blaine Copenheaver
*Assistant Examiner*—Leanna Roché
(74) *Attorney, Agent, or Firm*—Sherman & Shalloway

(57) ABSTRACT

A shock-absorbing material composed of an expansion-molded article of polypropylene resin particles is excellent in shock-absorbing property and impact resilience compared with shock-absorbing materials composed of other resin materials, but has not been said to be satisfactory in stiffness and energy absorption efficiency. The present invention relates to a shock-absorbing material composed of an expansion-molded article produced by using foamed particles comprising, as a base resin, a polypropylene homopolymer obtained by using a metallocene polymerization catalyst. The base resin has a tensile modulus of at least 15,000 kgf/cm², and the expansion-molded article has a crystal structure that an inherent peak a and a high-temperature peak b appear as endothermic peaks on a DSC curve obtained by the differential scanning calorimetry of the molded article. The high-temperature peak b is a peak appeared on the temperature side higher than a temperature corresponding to the inherent peak a, and the quantity of heat at the high-temperature peak is at least 25 J/g.

18 Claims, 6 Drawing Sheets

U.S. PATENT DOCUMENTS

| | | |
|---|---|---|
| 4,504,534 A | 3/1985 | Adachi et al. |
| 4,504,601 A | 3/1985 | Kuwabara et al. |
| 4,567,208 A | 1/1986 | Kuwabara et al. |
| 4,568,608 A | 2/1986 | Kuwabara et al. |
| 4,587,270 A | 5/1986 | Kuwabara et al. |
| 4,598,001 A | 7/1986 | Watanabe et al. |
| 4,602,082 A | 7/1986 | Akiyama et al. |
| 4,676,939 A | 6/1987 | Kuwabara |
| 4,692,507 A | 9/1987 | Akiyama et al. |
| 4,695,593 A | 9/1987 | Kuwabara et al. |
| 4,704,239 A | 11/1987 | Yoshimura et al. |
| 4,711,287 A | 12/1987 | Kuwabara et al. |
| 4,716,021 A | 12/1987 | Akiyama et al. |
| 4,749,725 A | 6/1988 | Akiyama et al. |
| 4,756,948 A | 7/1988 | Kuramochi et al. |
| 4,777,000 A | 10/1988 | Kuwabara et al. |
| RE32,780 E | 11/1988 | Yoshimura et al. |
| 4,822,542 A | 4/1989 | Kuwabara et al. |
| 4,840,973 A | 6/1989 | Kuwabara et al. |
| 4,889,671 A | 12/1989 | Akiyama et al. |
| 4,908,393 A | 3/1990 | Arai et al. |
| 4,948,817 A | 8/1990 | Kuwabara et al. |
| 5,032,620 A | 7/1991 | Arai et al. |
| 5,053,435 A | 10/1991 | Kuwabara et al. |
| 5,071,883 A | 12/1991 | Kuwabara et al. |
| 5,085,814 A | 2/1992 | Kamiyama et al. |
| 5,122,545 A | 6/1992 | Kuwabara et al. |
| 5,130,341 A | 7/1992 | Kuwabara et al. |
| 5,284,431 A | 2/1994 | Kuwabara et al. |
| 5,340,841 A | 8/1994 | Tokoro et al. |
| 5,391,581 A | 2/1995 | Kuwabara et al. |
| 5,459,169 A | 10/1995 | Tokoro et al. |
| 5,468,781 A | 11/1995 | Sugano et al. |
| 5,569,681 A | 10/1996 | Tokoro et al. |
| 5,622,756 A | 4/1997 | Tokoro et al. |
| 5,651,912 A | 7/1997 | Mitsumoto et al. |
| 5,679,450 A | 10/1997 | Tokoro et al. |
| 5,747,549 A | 5/1998 | Tsurugai et al. |

\* cited by examiner

SHOCK ABSORBING MATERIAL

This application is a 371 of PCT/JP97/02792 filed on Aug. 8, 1997 which claims priority from Japanese Patent Application No. HEI8-229289 Filed Aug. 12, 1996.

TECHNICAL FIELD

The present invention relates to a shock-absorbing material suitable for use in a core material for automotive bumpers, or the like.

BACKGROUND ART

At present, shock-absorbing materials used as core materials for automotive bumpers, and the like are made mainly of a synthetic resin foam. An automotive bumper making use of a synthetic resin foam is generally composed of a core formed of the synthetic resin foam, and a skin material made of a synthetic resin, with which the core is covered.

Shock-absorbing materials used as core materials for the automotive bumpers, and the like are generally required to satisfy 1) to have excellent energy absorption performance, 2) to have an excellent dimensional recovery factor and 3) to provide a low-density and light-weight material at the same time.

Japanese Patent Application Laid-Open Nos. 221745/1983 and 189660/1985 each disclose core materials for automotive bumpers, which satisfies the above three conditions.

These publications disclose polypropylene and ethylene-propylene copolymers as base resins for bumper cores.

Further, Japanese Patent Application Laid-Open No. 158441/1990 and Japanese Patent Application Laid-Open No. 258455/1995 disclose 1-butene-propylene random copolymers, and 1-butene-propylene random copolymers and ethylene-1-butene-propylene random terpolymers, respectively, as materials used for bumper cores.

When a shock-absorbing material used as a bumper core or the like is produced by using a polypropylene resin as a material, there is generally used the so-called bead molding process in which foamed particles are filled into a mold and heated to expand the foamed particles, thereby mutually fusion-bonding them to obtain an expansion-molded article conforming to the mold. The expansion-molded article of the polypropylene resin particles obtained by this process is excellent in shock-absorbing property and impact resilience and has excellent physical properties such as light weight and small residual strain.

Accordingly, the shock-absorbing material composed of the expansion-molded article of the polypropylene resin particles has excellent properties compared with shock-absorbing materials composed of other resin materials. However, its stiffness and energy absorption efficiency are not necessarily satisfactory, and so it yet leaves room to improve. Raw resins actually used for producing shock-absorbing materials at present are propylene copolymers. A polypropylene homopolymer itself is a high-stiffness polymer and most suitable for use as a raw resin for producing a shock-absorbing material. On the other hand, such a resin has involved problems that its molding temperature becomes high due to its high melting point, and the molding temperature range for successfully expanding it is limited due to its viscoelastic property. As described above, the use of the polypropylene homopolymer as the molding resin has involved the difficulty of presetting the optimum conditions upon molding and hence a problem that defective fusion bonding among resin particles is caused by, for example, a slight error in temperature setting. Therefore, this resin has been poor in moldability.

The reason why the propylene copolymers are actually used as molding resins is that their moldability is better compared with the polypropylene homopolymer.

However, the propylene copolymers naturally has the demerit that their stiffness is low, and so some attempts have been made to improve the stiffness by lessening the content of other component(s) than propylene in the copolymers. However, only unsatisfactory results have been obtained. In addition, any shock-absorbing material comprising a propylene copolymer as a base resin is unsatisfactory even from the viewpoint of energy absorption efficiency.

The investigation by the present inventors revealed that when a polypropylene homopolymer (hereinafter referred to as "the metallocene PP") obtained by using a metallocene polymerization catalyst is used as a molding resin, a shock-absorbing material having good physical properties is obtained.

However, it was also confirmed that in order for a shock-absorbing material to achieve high stiffness and energy absorption efficiency, the mere use of such a polypropylene homopolymer as a base resin is insufficient, and other factors than this must be added. Thus the present inventors have carried out a further investigation. As a result, it has been found that when the tensile modulus of the metallocene PP and the quantity of heat at a high-temperature peak appeared on a DSC curve obtained by the differential scanning calorimetry of the resulting molded article are defined within specific numerical ranges, a shock-absorbing material having high stiffness and energy absorption efficiency can be obtained. The present invention has been led to completion on the basis of this finding.

It is an object of the present invention to provide a shock-absorbing material used as a bumper core or the like, which is produced by using a polypropylene homopolymer as a molding raw resin.

Another object of the present invention is to provide a shock-absorbing material excellent in stiffness and energy absorption efficiency compared with the conventional materials.

A further object of the present invention is to provide a shock-absorbing material which imparts the advantage in production conditions that the pressure of steam fed into a mold upon molding can be controlled low.

DISCLOSURE OF THE INVENTION

The present invention relates to a shock-absorbing material composed of an expansion-molded article produced by using foamed particles comprising a metallocene PP as a base resin, wherein the base resin has a tensile modulus of at least 15,000 kgf/cm$^2$, and the expansion-molded article has a crystal structure that an inherent peak and a high-temperature peak appear as endothermic peaks on a DSC curve obtained by the differential scanning calorimetry of the molded article. The term "high-temperature peak" as used herein means a peak appeared on the temperature side higher than a temperature corresponding to the inherent peak of endothermic peaks appeared on a DSC curve obtained by heating 2 to 4 mg of a specimen cut out of the molded article to 220° C. at a heating rate of 10° C./min by means of a differential scanning calorimeter.

The foamed particles of the metallocene PP used in the production of the shock-absorbing material according to the present invention are those having a crystal structure that an inherent peak and a high-temperature peak appear as endothermic peaks on a DSC curve obtained by the differential scanning calorimetry of the foamed particles, and a quantity of heat of at least 25 J/g at the high-temperature peak.

When molding is conducted by using such foamed particles, the above-described crystal structure does not disappear, and so a molded article produced also has a similar crystal structure that an inherent peak and a high-temperature peak appear as endothermic peaks on its DSC curve. Further, the quantity of heat at the high-temperature peak in the molded article also indicates almost the same value as the quantity of heat at the high-temperature peak in the foamed particles, and its numerical value is at least 25 J/g.

The shock-absorbing material according to the present invention features that it is composed of an expansion-molded article of foamed particles comprising, as a base resin, a polypropylene homopolymer obtained by using a metallocene polymerization catalyst, the base resin has a tensile modulus of at least 15,000 kgf/cm², the expansion-molded article has a crystal structure that an inherent peak and a high-temperature peak appear as endothermic peaks on a DSC curve obtained by the differential scanning calorimetry of the molded article, and the quantity of heat at the high-temperature peak in the molded article is at least 25 J/g. The fact that the shock-absorbing material has these three factors brings about an effect of markedly improving stiffness and energy absorption efficiency compared with the shock-absorbing materials composed of an expansion-molded article comprising the conventional polypropylene copolymer as a base resin.

The expansion molded article has compression stress of at least 7.28 kgf/cm² and an energy absorption efficiency of at least 72.4 as reported in the below Table 2, and as illustrated in FIG. 3A and in FIG. 3B, respectively.

When the polypropylene homopolymer (metallocene PP) obtained by using the metallocene polymerization catalyst and used as a raw material for producing the shock-absorbing material according to the present invention is compared with a polypropylene homopolymer obtained by using a Ziegler-Natta catalyst, the metallocene PP characteristically has a lower melting point when both polymers have the same tensile modulus. As a result, when molding is conducted by using foamed particles comprising the metallocene PP as a base resin, the pressure of steam fed into a mold can be controlled lower, so that the following effects can be brought about. Namely, the consumption of heat can be decreased to reduce production cost, and the durability of the mold can be enhanced.

BEST MODE FOR CARRYING OUT THE INVENTION

Figure 1:
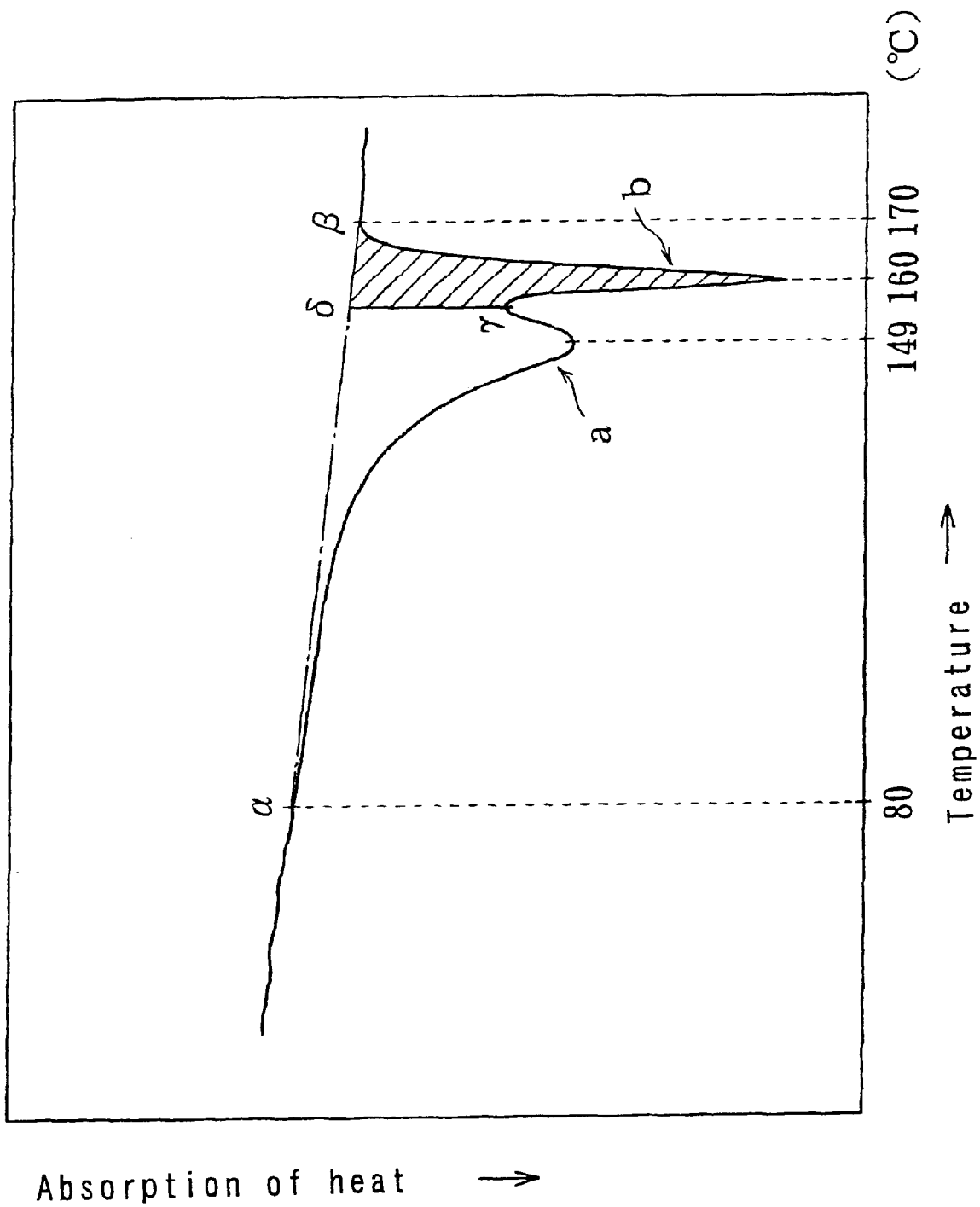
FIG. 1 illustrates an exemplary chart of a first DSC curve of a molded article.

The present invention relates to a shock-absorbing material, such as an automotive bumper core, composed of an expansion-molded article produced by using foamed particles comprising, as a base resin, a polypropylene homopolymer (metallocene PP) obtained by using a metallocene polymerization catalyst. The base resin of the foamed particles may be composed of either only the polypropylene homopolymer, or a blend of the polypropylene homopolymer as a main component with another resin or elastomer as will be described subsequently.

The metallocene polymerization catalyst used in obtaining the metallocene PP in the present invention is composed of a transition metal complex component having a metallocene structure, and a promotor component such as an alumoxane, Lewis acid or ionic compound.

The transition metal complex component has a structure that 2 conjugated 5-membered ring groups $C_5H_{4-m}R^1_m$ and $C_5H_{4-n}R^2_n$ are crosslinked by a crosslinking group Q, and transition metal compound MeXY is coordinated with this crosslinked product, and is represented by the following general formula (1):

$$Q(C_5H_{4-m}R^1_m)(C_5H_{4-n}R^2_n)MeXY \qquad (1)$$

wherein m and n are integers satisfying $0 \leq m, n \leq 4$.

The conjugated 5-membered ring groups $C_5H_{4-m}R^1_m$ and $C_5H_{4-n}R^2_n$ may be the same or different from each other. When m (or n) is 0, the conjugated 5-membered ring group is a cyclopentadienyl group.

$R^1$ and $R^2$ substituted on the respective conjugated 5-membered ring groups may be the same or different from each other. When one of the conjugated 5-membered ring groups has a plurality of the substituents $R^1$ (or $R^2$), these substituents $R^1$ (or $R^2$) may be the same or different from each other.

Examples of the substituents $R^1$ and $R^2$ include hydrocarbon groups, halogen atoms and alkoxy groups. The hydrocarbon groups may contain a silicon, phosphorus, boron or the like. The hydrocarbon groups may be monovalent substituents, or divalent substituents which are each bonded to the conjugated 5-membered ring group to form a ring. Therefore, indenyl and fluorenyl groups which are fused rings formed by sharing a double bond with the conjugated 5-membered ring group such as a cyclopentadienyl group may also be included in the concept of the conjugated 5-membered ring groups referred to in the present invention.

Examples of the crosslinking group Q crosslinking the two conjugated 5-membered ring groups include alkylene groups such as methylene, ethylene, isopropylene, phenylmethylene and diphenylmethylene groups, cycloalkylene groups such as a cyclohexylene group, silylene groups such as silylene, dimethylsilylene, phenylmethylsilylene, diphenylsilylene, disilylene and tetramethyldisilylene groups, and hydrocarbon groups containing germanium, phosphorus, boron or aluminum.

Me in the transition metal compound MeXY means a transition metal of Group IVB to VIB in the periodic table and is preferably titanium, zirconium or hafnium. X and Y combined with the transition metal Me are independently hydrogen, halogen, or a hydrocarbon, alkoxyl, amino or alkylamino group. The hydrocarbon group may contain phosphorus or silicon. X and Y may be the same or different from each other.

Specific example of such a transition metal complex component include compounds with conjugated 5-membered ring groups crosslinked by an alkylene group, such as ethylenebis(2-methylindenyl)zirconium dichloride, ethylenebis(2-methyl-4,5,6,7-tetrahydroindenyl)zirconium dichloride, ethylenebis(2,4-dimethylindenyl)zirconium dichloride, ethylenebis(2,4-dimethyl-4-hydroazurenyl)-zirconium dichloride, ethylenebis(4,5,6,7-tetrahydroindenyl)hafnium chloride, and compounds with conjugated 5-membered ring groups crosslinked by a silylene group, such as dimethylsilylenebis(4,5,6,7-tetrahydroindenyl)zirconium dichloride, dimethylsilylenebis(2-methylindenyl)zirconium dichloride, dimethylsilylenebis(2-methyl-4,5,6,7-tetrahydroindenyl)zirconium dichloride, dimethylsilylenebis(2,4-dimethylindenyl)zirconium chloride and dimethylsilylenebis(2,4-dimethyl-4-hydroazurenyl)zirconium dichloride.

On the other hand, specific examples of the promotor component include alumoxanes such as methylalumoxane, isobutylalumoxane and methylisobutylalmoxane, Lewis acids such as triphenylboron, tris(pentafluorophenyl)boron and magnesium chloride, and ionic compounds such as diemthylanilinium tetrakis(pentafluorophenyl)boron and triphenylcarbinium tetrakis(pentafluorophenyl)boron. These promotor components may be used in combination with an organoaluminum compound such as trimethylaluminum, triethylaluminum or truisobutylaluminum.

The shock-absorbing material according to the present invention is obtained by filling the foamed particles comprising the metallocene PP as a base resin into a mold which can be closed but not be sealed hermetically and has a desired shape, and feeding steam into the mold to heat and expand the foamed particles, thereby mutually fusion-bonding the foamed particles to obtain an expansion-molded article conforming to the mold.

The base resin constituting the shock-absorbing material according to the present invention is required to have a tensile modulus of at least 15,000 kgf/cm$^2$, preferably at least 15,500 kgf /cm$^2$. If the tensile modulus is lower than 15,000 kgf/cm$^2$, it cannot be expected that the stiffness and energy absorption efficiency of the resulting shock-absorbing material are markedly improved.

When the tensile modulus is measured, the measurement may be conducted by using a specimen cut out of a sheet obtained by melting pellets of the base resin into the sheet. However, it is actually more convenient to make a specimen from an expansion-molded article and conduct the measurement using this specimen. The following method can be adopted as a measuring method of the tensile modulus in the present invention.

Namely, a specimen is cut out of an expansion-molded article sample, and heated and pressed for 10 minutes by a hot press controlled to 220° C., thereby melting and deaerating the specimen to form a sheet having a thickness of 1 mm±0.1 mm. The sheet thus obtained is used to measure its tensile modulus in accordance with JIS K 7113 under the following conditions:

| Specimen: | JIS No. 2 type |
|---|---|
| Testing rate: | 50 mm/min |
| Distance between chucks: | 80 mm. |

When a metallocene PP having a tensile modulus of at least 15,000 kgf/cm$^2$ (preferably at least 15,500 kgf/cm$^2$) is used as a base resin, it goes without saying that the tensile modulus value can be controlled within the above range.

The tensile modulus value of a metallocene PP generally varies according to the crystallinity, average molecular weight and molecular weight distribution of the metallocene PP, the kind of a polymerization catalyst used, and the like. Accordingly, if numerical values of these parameters are suitably selected upon the production of a metallocene PP, the tensile modulus of the resulting metallocene PP can be controlled within the above range.

Preferable examples of the metallocene PP suitable for use in the production of the shock-absorbing material according to the present invention include those marketed under the trade names of "Achieve 3844", "Achieve 3825" and "Achieve 3904" by Exxon Co. in U. S. A.

The DSC curve obtained by the differential scanning calorimetry of a molded article in the present invention means a DSC curve obtained by heating 2 to 4 mg of a specimen cut out of an expansion-molded article constituting the shock-absorbing material according to the present invention to 220° C. at a heating rate of 10° C./min by means of a differential scanning calorimeter.

Figure 2:
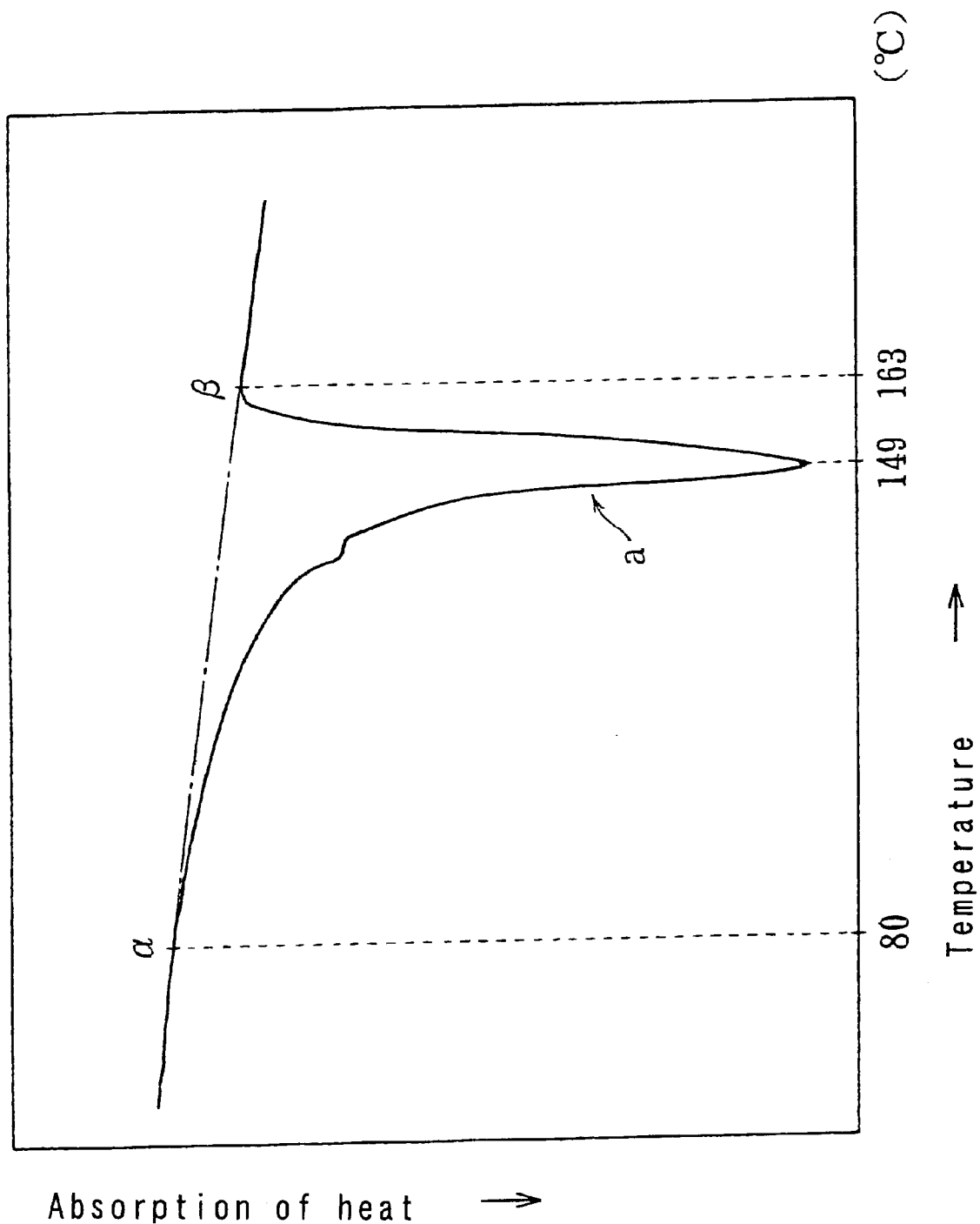
FIG. 2 illustrates an exemplary chart of a second DSC curve of the molded article.

Here, the DSC curve obtained by heating the above specimen from room temperature to 220° C. at a heating rate of 10° C./min is referred to as a first DSC curve (illustrating an example thereof in FIG. 1), and a DSC curve obtained by cooling the specimen from 220° C. to about 40° C. at a cooling rate of 10° C./min and heating it again to 220° C. at a heating rate of 10° C./min is referred to as a second DSC curve (illustrating an example thereof in FIG. 2). In this case, as illustrated in FIG. 1, endothermic peaks a and b arise on the first DSC curve. Of these endothermic peaks, the endothermic peak b appeared on the temperature side higher than a temperature corresponding to the endothermic peak a appears only on the first DSC curve, and does not appear on the second DSC curve.

The endothermic peak a appeared on both first and second DSC curves is attributable to the absorption of heat upon the so-called fusion of the metallocene PP which is a base resin, and is an endothermic peak inherent in the metallocene PP. The endothermic peaks a and b will hereinafter be referred to as an inherent peak and a high-temperature peak, respectively.

The high-temperature peak b appeared only on the first DSC curve is attributable to the existence of a crystal structure different from the crystal structure of an expansion-molded article on the DSC curve of which no high-temperature peak b appears.

More specifically, since the inherent peak a appears on both first and second DSC curves, whereas the high-temperature peak b appears only on the first DSC curve, and does not appear on the second DSC curve obtained by heating the specimen under the same conditions, it is considered that the crystal structure of the expansion-molded article, in which the high-temperature peak b appears together with the inherent peak a, is not attributable to the crystal structure of the base resin itself, but attributable to a crystal structure inherent in the expansion-molded article as a result of having gone through heat history.

Incidentally, it is desired that a difference between the temperature corresponding to the top of the high-temperature peak b appeared on the first DSC curve and the temperature corresponding to the top of the inherent peak a appeared on the second DSC curve be greater, and the difference between them is at least 50° C., preferably at least 10° C. In FIG. 1, the two endothermic peaks are drawn by a gently-sloping curve. However, the DSC curve does not always become such a gently-sloping curve, and so in some cases, a plurality of overlapping endothermic peaks may appear on a chart, and 2 endothermic peaks of the inherent peak and high-temperature peak may appear on the chart as a whole.

The high-temperature peak b is confirmed by the comparison of the first DSC curve with the second DSC curve. The quantity of heat at the high-temperature peak b is determined by the following method. As shown in FIG. 1, a straight line is first drawn between a point α at 80° C. on the DSC curve, and a point β on the DSC curve which indicates the melting completion temperature of the base resin. A line parallel to the ordinate axis of the graph is then drawn from a point γ on the DSC curve which corresponds to a valley between the inherent peak a and the high-temperature peak b, to the straight line connecting the point a and the point β. The intersection thereof is regarded as a point δ. The quantity of heat corresponding to a section (an area hatched in FIG. 1) surrounded by a straight line connecting the point δ thus obtained and the point β, the straight line connecting the point γ and the point δ, and a DSC curve connecting the point γ and the point β is determined as the quantity of heat at the high temperature peak b.

The quantity of heat (hereinafter referred to as the quantity of heat at the high-temperature peak) at the high-temperature peak b in the expansion-molded article constituting the shock-absorbing material according to the present invention is at least 25 J/g, preferably at least 27 J/g, more preferably at least 30 J/g.

In the present invention, a shock-absorbing material used as a bumper core or the like having high stiffness and excellent energy absorption efficiency can be provided by molding foamed particles comprising the metallocene PP as a base resin into an expansion-molded article and controlling the tensile modulus of the base resin and the quantity of heat at the high-temperature peak of the molded article to at least 15,000 kgf/cm$^2$ and at least 25 J/g, respectively. However, if the quantity of heat at the high-temperature peak is lower than 25 J/g, the stiffness inherent in the base resin cannot be derived, and so even if the tensile modulus of the base resin is 15,000 kgf/cm$^2$ or higher, it cannot be expected to provide a shock-absorbing material markedly improved in stiffness and energy absorption efficiency.

Figure 3A:
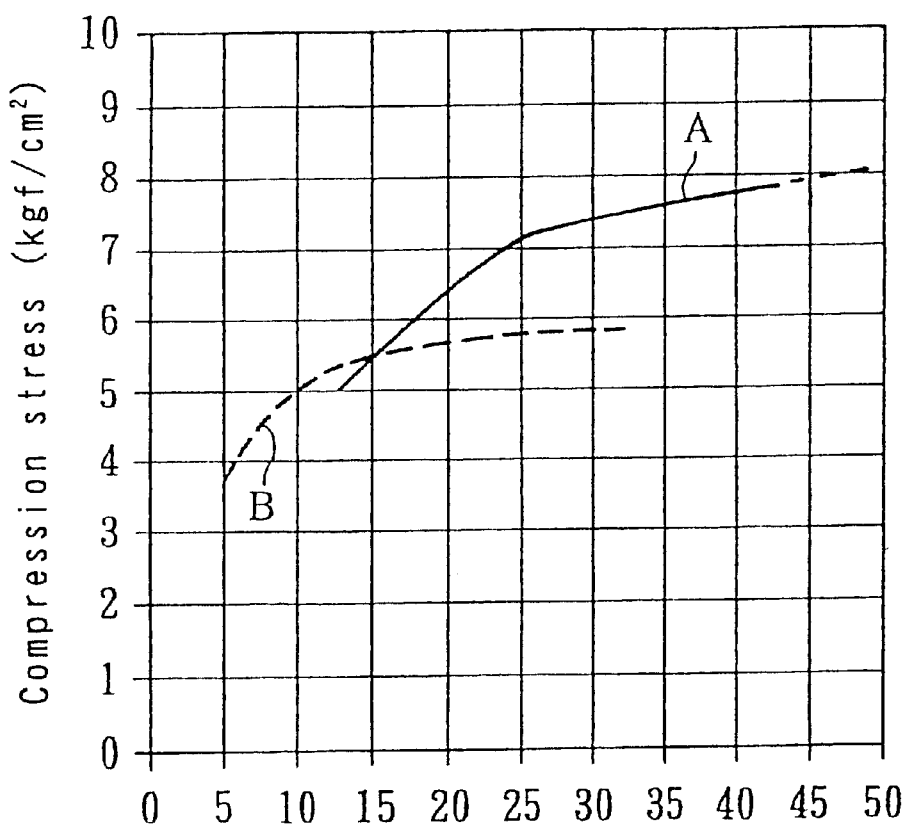
FIG. 3A diagrammatically illustrates the relationship between the quantity of heat at the high-temperature peak of a molded article and compression stress; the FIG. 3B diagrammatically illustrates the relationship between the quantity of heat at the high-temperature peak of a molded article and energy absorption efficiency (%).

A curve A shown in FIG. 3A is an example diagrammatically illustrating the relationship between the quantity of heat at the high-temperature peak of an expansion-molded article constituting the shock-absorbing material according to the present invention and stress under 50% compression. As also understood from this example, the compression stress of the molded article is markedly lowered if the quantity of heat at the high-temperature peak is lower than 25 J/g, and so the stiffness inherent in the base resin cannot be derived.

The curve A is a curve about an expansion-molded article having a density of 0.06 g/cm$^3$ produced by using a metallocene PP (trade name: "Achieve 3844"; product of Exxon Co. in U. S. A.) having a tensile modulus of 22,000 kgf/cm$^2$ and a melting point $T_m$ of 150° C. as a base resin. A curve B in FIG. 3 is a curve about an expansion-molded article having a density of 0.06 g/cm$^3$ produced by using a propylene-ethylene random copolymer (ethylene content: 2.3% by weight) having a tensile modulus of 12,000 kgf/cm$^2$ and a melting point $T_m$ of 146° C. as a base resin. As shown by this curve B, the molded article comprising the propylene copolymer as a base resin has no point of inflection related to the compression stress at 25 J/g. The compression stress characteristics having a point of inflection at 25 J/g are characteristic of the expansion-molded article comprising the metallocene PP as a base resin, which constitutes the shock-absorbing material according to the present invention.

The curve A illustrated in FIG. 3 indicates that if the quantity of heat at the high-temperature peak of the metallocene PP is 25 J/g or higher, its compression stress becomes high, and so the stiffness of the resin also becomes high. When the quantity of heat at the high-temperature peak is 25 J/g or higher, a change in compression stress is slight. Therefore, the degree of stiffness imparted to the shock-absorbing material can be controlled with ease.

Figure 3B:
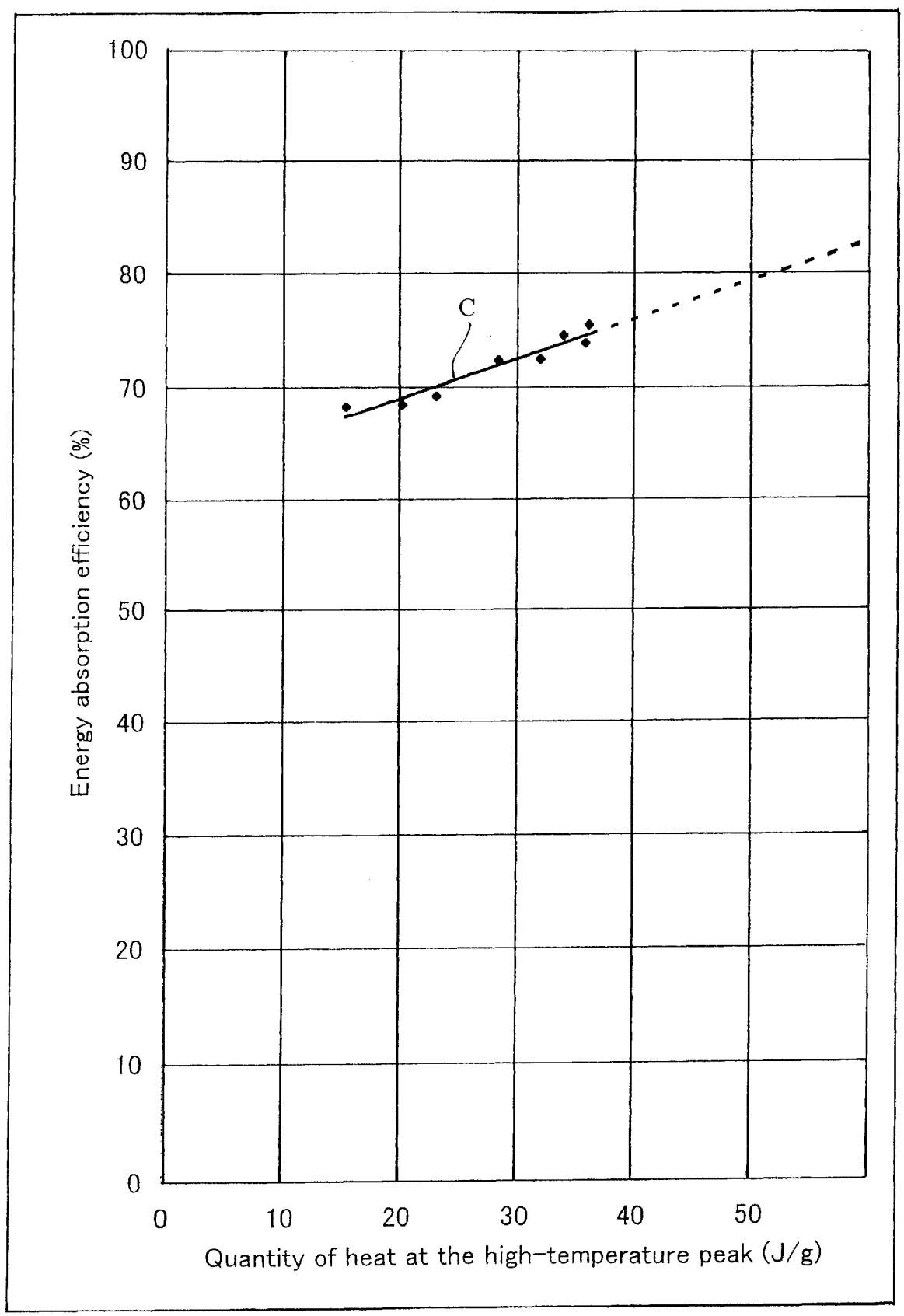

The FIG. 3B diagrammatically illustrates the relationship between the quantity of heat at the high-temperature peak of a molded article and the energy absorption efficiency (%).

The curve C in FIG. 3B is an example diagrammatically illustrating the relationship between the quantity of heat at the high-temperature peak of an expansion-molded article constituting the shock-absorbing material and energy absorption efficiency (%) as reported in Table 2.

The expansion-molded article on the DSC curve of which a high-temperature peak b appears can be obtained by conducting the differential scanning calorimetry of foamed particles in the same manner as the above-described method for obtaining the DSC curves of the molded article and using foamed particles on the first DSC curve of which an inherent peak and a high-temperature peak appear like the first DSC curve of the molded article to mold them. Such foamed particles are obtained by defining the temperature and time at and for which particles of the metallocene PP are heated and held before expansion, and further a foaming temperature in a production process of foamed articles which will be described subsequently.

More specifically, when foamed particles are produced under the specific conditions, the foamed particles obtained under such conditions come to have a crystal structure that a high-temperature peak appears on a DSC curve thereof. Such a crystal structure does not disappear upon molding, and so an expansion-molded article obtained by the molding also has a similar crystal structure. Incidentally, the quantity of heat at the high-temperature peak of the foamed particles can be determined from the first DSC curve of the foamed particles in accordance with the same procedure as that for obtaining the quantity of heat at the high-temperature peak of the molded article. The value thereof is approximately equal to the quantity of heat at the high-temperature peak of the molded article.

More specifically, when foamed particles having a crystal structure that an inherent peak and a high-temperature peak appear on a DSC curve obtained by the differential scanning calorimetry thereof and comprising, as a base resin, a metallocene PP, and having a quantity of heat of at least 25 J/g at the high-temperature peak are used to mold them, an expansion-molded article having the same crystal structure and quantity of heat at the high-temperature peak as those of the foamed particles can be obtained.

In the present invention, the metallocene PP is used as a base resin for foamed particles. However, a mixture obtained by blending the metallocene PP as a main component with another resin or elastomer as a secondary component may be used as the base resin so far as no detrimental influence is thereby imposed on the effects of the present invention.

Examples of another resin capable of being mixed with the metallocene PP include various thermoplastic resins, such as polypropylene resins obtained by using another Ziegler-Natta catalyst than the metallocene polymerization catalysts, polyolefin resins such as high density polyethylene, linear low density polyethylene, very low density polyethylene, low density polyethylene, ethylene-vinyl acetate copolymers, ethylene-acrylic ester copolymers, ethylene-acrylic acid copolymers and ethylene-methacrylic acid copolymers, and polystyrene resins.

Examples of the elastomer capable of being mixed with the metallocene PP include solid rubbers such as ethylene-propylene rubber, ethylene-i-butene rubber, propylene-1-butene rubber, styrene-butadiene rubber and hydrogenated products thereof, isoprene rubber, neoprene rubber, and nitrile rubber, and polystyrene elastomers such as styrene-butadiene block copolymer elastomers and hydrogenated products thereof. Besides the above, various kinds of other elastomers may be used.

The mixing amount of the secondary component is less than 50 parts by weight, preferably less than 30 parts by weight per 100 parts by weight of the metallocene PP. Any mixing amount may be selected within the above range of the mixing amount so far as the tensile modulus of the resulting base resin is retained in the above-described range, and the development of the high-temperature peak and the value of the quantity of heat at the high-temperature peak are not adversely affected.

Various kinds of additives may be incorporated into the base resin. Examples of the additives include antioxidants, ultraviolet absorbents, antistatic agents, flame retardants, metal deactivators, pigments, dyes, inorganic substances and nucleating agents. These additives are mixed in an amount of 20 parts by weight or less, preferably 5 parts by weight or less per 100 parts by weight of the base resin though it varies according to the physical properties required of the resulting expansion-molded article. Incidentally, examples of the inorganic substances to be mixed with the base resin include talc, calcium carbonate, borax and aluminum hydroxide.

The mixing of the above-described secondary component and additives with the metallocene PP is generally conducted by melting and kneading them. For example, they are kneaded at a desired temperature by means of any of various kneading machines such as a roll mixer, screw mixer, Banbury mixer, kneader, blender and mill.

The foamed particles used for obtaining the shock-absorbing material according to the present invention are produced by first of all producing resin particles in the form of pellets by, for example, a means in which the base resin is melted and kneaded in an extruder, the melt is extruded in the form of a strand, and the strand is cooled and then chopped into proper lengths, or chopped into proper lengths and then cooled. The resin particles thus produced are then dispersed in a dispersion medium in the presence of a foaming agent in a closed vessel, and a dispersing agent is added to the dispersion medium as needed. The contents are then heated to a temperature of at least the softening temperature of the resin particles to impregnate the resin particles with the foaming agent. Thereafter, the closed vessel is opened at one end thereof to release the resin particles and the dispersion medium at the same time from the vessel into an atmosphere of a pressure (generally, under atmospheric pressure) lower than the internal pressure of the vessel while maintaining the internal pressure of the vessel at the vapor pressure of the foaming agent or higher, thereby expanding the resin particles to obtain foamed particles.

When foamed particles obtained by heating, upon the heating of the resin particles in the closed vessel, the resin particles to an optional heating temperature $T_a$ within a range of from not lower than [the melting point $T_m$ of the metallocene PP−15° C.] to lower than the melting completion temperature $T_e$ of the metallocene PP without heating the resin particles to the melting completion temperature $T_e$ of the metallocene PP or higher, holding them at this temperature $T_a$ for a sufficient period of time (preferably, about 10 to 60 minutes), and then heating them to an optional heating temperature $T_b$ within a range of from not lower than [the melting point $T_m$−150° C.] to [the melting completion temperature $T_e$+5° C.] to hold them at this temperature $T_b$ for an additional sufficient period of time (preferably, about 10 to 60 minutes) if necessary, thereby expanding the resin particles, are used, an expansion-molded article having a crystal structure on the DSC curve of which a high-temperature peak b appears can be obtained.

The quantity of heat at the high-temperature peak on the DSC curve of the molded article mainly depends on the holding temperatures $T_a$ and holding time at the temperature $T_a$, the holding temperature $T_b$ and holding time at the temperature $T_b$ for the resin particles upon the production of the foamed particles, and a heating rate.

Incidentally, the temperature ranges described above are temperature ranges in the case where an inorganic gas type foaming agent is used as the foaming agent. Accordingly, when the foaming agent is changed to a volatile organic foaming agent, the suitable temperature ranges are shifted on the temperature sides lower than the above temperature ranges according to the kind and amount of the volatile organic foaming agent used.

Figure 4:
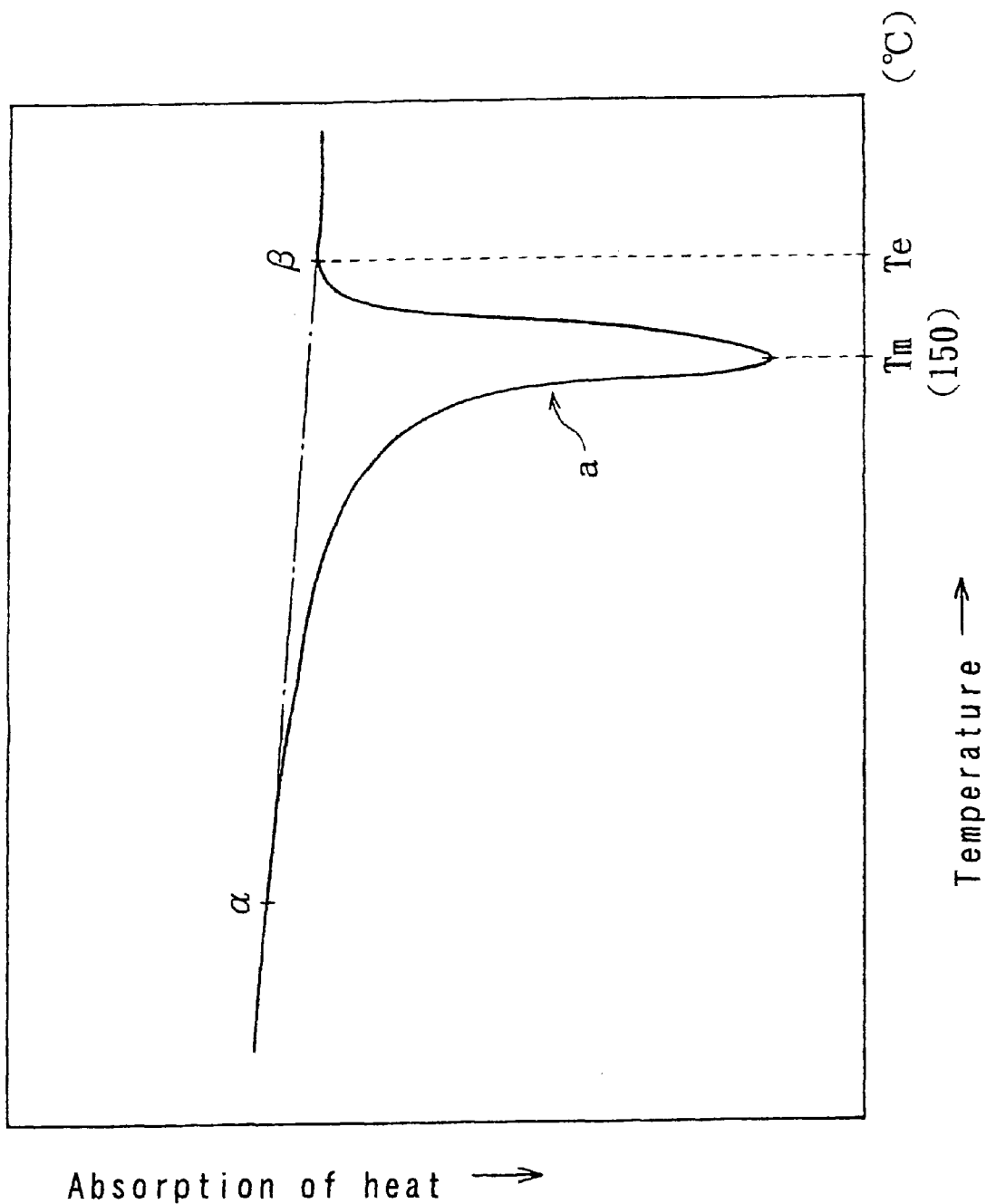
FIG. 4 illustrates an exemplary chart of a DSC curve of a base resin.

The melting point $T_m$ of the metallocene PP means a temperature corresponding to a top of an inherent peak a appeared on a second DSC curve (illustrating an example thereof in FIG. 4) obtained by using 2 to 4 mg of the metallocene PP as a sample to conduct its differential scanning calorimetry in the same manner as the above-described method for obtaining the DSC curves of the expansion-molded article, while the melting completion temperature $T_e$ means a temperature corresponding to a point on the temperature side higher than the temperature corresponding to the inherent peak a, at which the DSC curve is just returned from the top of the inherent peak a to a position of the base line.

The metallocene PP used in the production of the shock-absorbing material according to the present invention preferably has a melting point $T_m$ of 140 to 160° C., most desirably 145 to 158° C.

As the foaming agent used in obtaining the foamed particles, there may be generally used a volatile foaming agent, such as an aliphatic hydrocarbon such as propane, butane, pentane, hexane or heptane, an alicyclic hydrocarbon such as cyclobutane or cyclopentane, or a halogenated hydrocarbon such as trichlorofluoromethane, dichlorodifluoromethane, dichlorotetrafluoroethane, methyl chloride, ethyl chloride or methylene chloride, an inorganic gas type foaming agent such as nitrogen, carbon dioxide, argon or air, or a mixer thereof. In particular, he inorganic gas type foaming agent is preferred in that it causes no ozonosphere destruction and is cheap, with nitrogen, air or carbon dioxide being particularly preferred.

The amount of the foaming agents other than nitrogen and air to be used is generally 2 to 50 parts by weight per 100 parts by weight of the resin particles. When nitrogen or air is used as the foaming agent on the other hand, it is introduced into a closed vessel under a pressure ranging from 20 to 60 kgf/cm$^2$G. The amount of the foaming agent to be used is suitably controlled according to the relationship between the foamed particles intended to obtain, and a foaming temperature and/or the quantity of heat at the high-temperature peak of the resulting expansion-molded article.

No particular limitation is imposed on the dispersion medium used in dispersing the resin particles therein so far as it does not dissolve the resin particles. Examples of such a dispersion medium include water, ethylene glycol, glycerol, methanol and ethanol. Water is generally used.

As the dispersing agent optionally added upon dispersing the resin particles in the dispersion medium, there may be used fine particles of aluminum oxide, titanium oxide, basic magnesium carbonate, basic zinc carbonate, calcium carbonate, kaolin, mica or clay. It is generally added to the dispersion medium in a proportion of 0.2 to 2 parts by weight per 100 parts by weight of the base resin.

The shock-absorbing material according to the present invention can be obtained by optionally subjecting the foamed particles thus obtained to pretreatments such as application of an internal pressure to the foamed particles, filling the foamed particles into a mold which can be closed but not be sealed hermetically, heating the foamed particles with steam of about 3.0 to 6.0 kg/cm$^2$G to secondarily expand the foamed particles and at the same time mutually fusion-bond them, and then cooling a molded product thus obtained. In order to apply the internal pressure to the foamed particles, the foamed particles are placed in a closed vessel, and pressurized air is fed to the vessel to increase the internal pressure of the foamed particles to a predetermined pressure.

The density of the shock-absorbing material according to the present invention is generally 0.02 to 0.3 g/cm$^3$, preferably 0.03 to 0.2 g/cm$^3$ from the viewpoints of sufficient energy absorption performance and light-weight property.

Incidentally, the density of the expansion-molded article is determined by finding a volume V (cm$^3$) of the expansion-molded article from its outside dimensions and dividing the weight W (g) of the expansion-molded article by this volume V (cm$^3$).

Since the shock-absorbing material according to the present invention has high stiffness and excellent energy absorption efficiency, the sufficient stiffness and energy absorption efficiency can be retained even when the expansion ratio of the resulting molded article is enhanced to lighten its weight compared with the conventional products, or the thickness of the shock-absorbing material is thinned compared with the conventional products.

The shock-absorbing material according to the present invention is typically used as a core material for automotive bumpers. Besides, it is preferably used as a automotive interior material integrated with a skin material. Examples of the automotive interior material include dashboards, console lids, instrument panels, door panels, door trims, ceiling materials, interior materials for pillar parts, sun visors, arm rests and head rests.

The present invention will hereinafter be described in more detail by the following Examples (Examples 1 to 4) and Comparative Examples (Comparative Examples 1 to 3).

Various base resins having their corresponding melting points (°C.) and MI (g/10 min) shown in Table 1 were separately melted and kneaded in an extruder, and each of the thus-melted base resins was extruded into a strand through a die and quenched in water. The strand thus quenched was chopped into predetermined lengths, thereby forming pellets (weight: about 2 mg per pellet). The pellets (1,000 g) were dispersed in water (3,000 cc) in a closed vessel (volume: 5 liters). Dry ice (CO$_2$) was added in its corresponding amount shown in Table 1 to the dispersion, and kaolin (5 g) as a dispersing agent and sodium dodecylbenzenesulfonate (0.05 g) as a surfactant were then added to the dispersion. While stirring the contents in the closed vessel, they were heated to its corresponding holding temperature under heating shown in Table 1 without heating them to the melting completion temperature T$_e$ of the base resin or higher and held for 15 minutes. The contents were then heated to its corresponding foaming temperature shown in Table 1 without heating them to the melting completion temperature T$_e$ of the base resin or higher and held for 15 minutes. Thereafter, pressurized nitrogen was introduced into the closed vessel to apply a back pressure of (the equilibrium vapor pressure of the foaming agent)+10 kg/cm$^2$G to the closed vessel. While keeping the back pressure, the vessel was opened at one end thereof to release the resin particles and water at the same time, thereby expanding the resin particles to obtain foamed particles. The quantity of heat at the high-temperature peak and bulk density of the foamed particles thus obtained were measured. The results are shown in Table 1.

After the foamed particles were then dried for 24 hours in an oven controlled at 60° C., they were pressurized for 24 hours by pressurized air of 2 kg/cm$^2$G in a closed vessel to apply an internal pressure of 1.4 kg/cm$^2$G to the foamed particles. The thus-treated foamed particles were then filled into a mold which can be closed but not be sealed hermetically and has a prescribed shape, and heated with steam under its corresponding molding vapor pressure shown in Table 1 to mold them. After cooling the thus-obtained expansion-molded article, it was taken out of the mold and dried for 24 hours in an oven controlled at 60° C. to obtain a shock-absorbing material as a product.

The tensile modulus, quantity of heat at the high-temperature peak, density, compression stress and energy absorption efficiency of the resultant expansion-molded article (shock-absorbing material) were determined. The results are shown in Table 2.

The measuring methods of the quantity of heat at the high-temperature peak and bulk density of each foamed particle sample, and the measuring methods of the tensile modulus, quantity of heat at the high-temperature peak, density, compression stress and energy absorption efficiency of each expansion-molded article sample are as follows.

(Measuring Method of Quantity of Heat at the High-temperature Peak of Foamed Particles)

Such a DSC curve as shown in FIG. 1 was prepared by the differential scanning calorimetry of each foamed particle sample to determine a quantity of heat corresponding to a section (an area hatched in FIG. 1) surrounded by a straight line connecting a point δ and a point β, a straight line connecting a point γ and the point δ, and a curve connecting the point γ and the point β by calculation, said respective points being shown in FIG. 1, and the numerical value thereof was regarded as the quantity of heat at the high temperature peak.

(Measuring Method of Bulk Density of Foamed Particles)

The bulk density of each foamed particle sample was determined by providing a container having a volume of 1,000 cm$^3$ and an opening at its top, filling the sample into the container at ordinary temperature and pressure, removing a portion of the foamed particle sample beyond the opening of the container, thereby substantially conforming the bulk height of the foamed particle sample to the opening of the container, and dividing the weight (g) of the foamed particle sample within the container at this time by 1,000 cm$^3$.

(Measuring Method of Tensile Modulus of Expansion-molded Article).

A specimen was cut out of each expansion-molded article sample, and heated and pressed for 10 minutes by a hot press controlled to 220° C., thereby melting and deaerating the specimen to form a sheet having a thickness of 1 mm±0.1 mm. The sheet thus obtained was used to measure its tensile modulus in accordance with JIS K 7113 under the following conditions:

| Specimen: | JIS No. 2 type |
|---|---|
| Testing rate: | 50 mm/min |
| Distance between chucks: | 80 mm. |

(Measuring Method of Quantity of Heat at the High-temperature Peak of Expansion-molded Article)

The quantity of heat at the high-temperature peak of each expansion-molded article sample was determined in the same manner as in the measuring method of quantity of heat at the high-temperature peak of each foamed particle sample.

(Measuring Method of Density of Expansion-molded Article)

The density of each expansion-molded article sample was determined by finding a volume V (cm$^3$) of the sample from its outside dimensions and dividing the weight W (g) of the sample by this volume V (cm$^3$).

(Measuring Method of Compression Stress and Energy Absorption Efficiency of Expansion-molded Article)

A specimen 50 mm long, 50 mm wide and 25 mm high was cut out of each expansion-molded article (shock-absorbing material) sample, and this specimen was used to conduct a test under conditions of a specimen temperature of 20° C. and a rate of loading of 10 mm/min in accordance with JIS Z 0234 Method A, thereby preparing a stress-strain diagram (illustrating an example thereof in FIG. 5) at the time a load was applied to the specimen on the basis of the test data. Compression (C) at the time of 50% strain was found from this diagram and regarded as the compression stress of the expansion-molded article sample. On the other hand, the energy absorption efficiency of the expansion-molded article sample was determined by the following equation:

Energy absorption efficiency (%)=[(Area of OAB)/(Area of OABC)]×100

Figure 5:
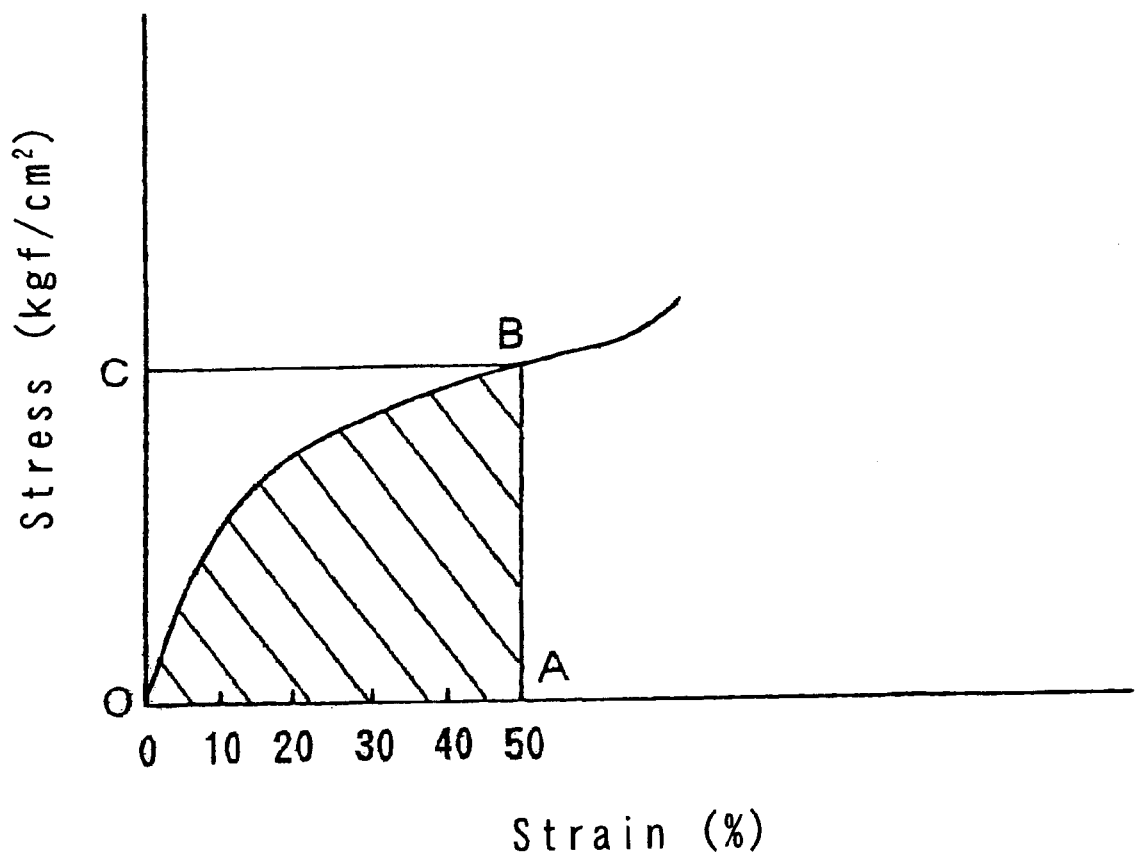
FIG. 5 illustrates a stress-strain diagram of a molded article.

More specifically, the energy absorption efficiency (%) is expressed in terms of a percentage of a value obtained by dividing an area surrounded by a line connecting points O, A and B in such a stress-strain diagram as illustrated in FIG. 5 by an area (area hatched in FIG. 5) of a square regarding points O, A, B and C as vertexes.

The Compression stress reported in Table 2 of this application is a stress at 50% strain found from the stress-strain diagram prepared by applying a load to a specimen 50 mm long, 50 mm wide and 25 mm high as apparent from the description on pages 31 and 32 of the present specification and FIG. 5. The Energy absorption efficiency is also a value at 50% strain.

On the other hand, the amount of the Unit volume energy absorption (E/A) described in column 12, lines 22 to 29 of Sugano et al. U.S. Pat. No. 5,468,781 and in the Tables 2 and 3 of the patent is a value obtained by the calculation of Stress (kgf/cm$^2$) at 50% strain×Energy absorption efficiency×0.5.

The compression stress in the present invention is determined in the same manner as in Sugano et al. and corresponds to the stress at 50% strain in Sugano et al.

The Energy absorption efficiency shown in Table 2 of the specification of the present application is expressed as a percentage obtained by multiplying by a hundred a ratio of an area surrounded by a line connecting points O, A and B to an area of a square regarding points O, A, B and C at 50% strain in the stress-strain diagram as illustrated in FIG. 5. The Energy absorption efficiency in Sugano et al. corresponds to a ratio of an area surrounded by a line connecting points O, A and B to an area of a square regarding points O, A, B and C at 50% strain in the stress-strain diagram. Therefore, a value obtained by multiplying the Energy absorption efficiency shown in Table 2 of the present specification by 0.01 corresponds to the Energy absorption efficiency in Sugano et al.

Accordingly, a value obtained by multiplying the applicants' value of Compression stress (kgf/cm$^2$)×Energy absorption efficiency×0.01 by 0.5 corresponds to the Sugano et al. amount of the unit volume energy absorption (E/A).

The unit volume energy absorption E/A for applicants' Examples 1 to 5 and Comparative Examples 1 to 3 are shown in Table 2 as amended.

It is understood from the above results that the shock-absorbing materials according to the present invention show higher compression stress compared with the comparative expansion-molded articles and hence have higher stiffness. In addition, the shock-absorbing materials according to the present invention show higher numerical values even in energy absorption efficiency than the comparative expansion-molded articles.

TABLE 1

| | | Base resin | | Foaming conditions | | | Foamed particles | | Molding conditions |
|---|---|---|---|---|---|---|---|---|---|
| | Kind of polymer | MI (g/10 min) | Melting point (° C.) | Amount of CO$_2$ (g) | Holding temp. under heating (° C.) | Foamimg temp. (° C.) | Quantity of heat at high-temp. peak (J/g) | Bulk density (g/cm$^3$) | Molding vapor pressure (kg/cm$^2$G) |
| Ex. 1 | Metallocene propylene homopolymer | 15.7 | 150 | 90 | 145.5 | 150.5 | 36.5 | 0.056 | 3.6 |
| Ex. 2 | Metallocene propylene homopolymer | " | " | 85 | 146.5 | 151.5 | 32.9 | 0.055 | 4.0 |
| Ex. 3 | Metallocene propylene homopolymer | " | " | 80 | 146.0 | 151.0 | 34.5 | 0.057 | 3.8 |
| Ex. 4 | Metallocene propylene homopolymer | " | " | 75 | 147.0 | 152.0 | 29.0 | 0.056 | 3.6 |

TABLE 1-continued

| | Base resin | | | Foaming conditions | | | Foamed particles | | Molding conditions |
|---|---|---|---|---|---|---|---|---|---|
| | Kind of polymer | MI (g/10 min) | Melting point (° C.) | Amount of $CO_2$ (g) | Holding temp. under heating (° C.) | Foaming temp. (° C.) | Quantity of heat at high-temp. peak (J/g) | Bulk density (g/cm³) | Molding vapor pressure (kg/cm²G) |
| Ex. 5 | Metallocene propylene homopolymer | 30.1 | 149 | 95 | 145.5 | 150.5 | 36.0 | 0.058 | 4.0 |
| Comp. Ex. 1 | Metallocene propylene homopolymer | 15.7 | 150 | 60 | 148.0 | 153.0 | 19.7 | 0.058 | 3.2 |
| Comp. Ex. 2 | Metallocene propylene homopolymer | " | " | 70 | 147.5 | 152.5 | 23.4 | 0.055 | 3.2 |
| Comp. Ex. 3 | Metallocene propylene homopolymer | " | " | 55 | 149.0 | 154.0 | 16.3 | 0.053 | 3.0 |

TABLE 2

| | Tensile Modulus (kgf/cm²) | Quantity of heat at high-temperature peak (J/g) | Density (g/cm³) | Compression Stress (kgf/cm²) | Energy absorption efficiency (%) | Unit Vol. Energy Abs. AT 50% Strain Kgf.cm/cm³ |
|---|---|---|---|---|---|---|
| Ex. 1 | 22,000 | 36.1 | 0.06 | 7.73 | 75.4 | 2.91 |
| Ex. 2 | " | 31.9 | " | 7.28 | 72.4 | 2.64 |
| Ex. 3 | " | 33.9 | " | 7.62 | 74.5 | 2.84 |
| EX. 4 | " | 28.4 | " | 7.12 | 72.3 | 2.57 |
| Ex. 5 | 20,000 | 35.8 | " | 7.30 | 73.8 | 2.69 |
| Comp. Ex. 1 | 22,000 | 20.2 | " | 6.39 | 68.5 | 2.19 |
| Comp. Ex. 2 | " | 23.1 | " | 6.84 | 69.2 | 2.37 |
| Comp. Ex. 3 | " | 15.4 | " | 5.50 | 68.3 | 1.88 |

Industrial Applicability

The shock-absorbing materials according to the present invention have high stiffness and excellent energy absorption efficiency and thus are particularly useful as bumper cores because they have all properties required of bumper cores when they are used as, for example, core materials for automotive bumpers.

What is claimed is:

1. A shock-absorbing material composed of an expansion-molded article produced by using foamed particles comprising, as a base resin, only a polypropylene homopolymer obtained by using a metallocene polymerization catalyst or foamed particles comprising, as a base resin, a blend of a polypropylene homopolymer obtained by using a metallocene polymerization catalyst, as a main component, with another resin or elastomer, wherein the base resin has a tensile modulus of at least 15,000 kgf/cm², the expansion-molded article has compression stress of at least 7.28 kgf/cm² and an energy absorption efficiency of at least 72.4 and has a crystal structure so that an inherent peak and a high-temperature peak appear as endothermic peaks on a DSC curve obtained by the differential scanning calorimetry of the molded article, said high-temperature peak meaning a peak appeared on the temperature side higher than a temperature corresponding to the inherent peak of endothermic peaks on a DSC curve obtained by heating 2 to 4 mg of a specimen cut out of the expansion-molded article to 220° C. at a heating rate of 10° C./min by means of a differential scanning calorimeter, and a quantity of heat at the high-temperature peak is at least 25 J/g.

2. The shock-absorbing material according to claim 1, wherein the base resin is composed of only a polypropylene homopolymer obtained by using a metallocene polymerization catalyst.

3. The shock-absorbing material according to claim 1, wherein the base resin is composed of a blend of a polypropylene homopolymer obtained by using a metallocene polymerization catalyst, as a main component, with another resin or elastomer.

4. The shock-absorbing material according to claim 1, wherein the base resin has a tensile modulus of at least 15,500 kgf/cm².

5. The shock-absorbing material according to claim 1, wherein the quantity of heat at the high-temperature peak appearing on the DSC curve is at least 30 J/g.

6. The shock-absorbing material according to claim 1, wherein the expansion-molded article has a crystal structure so that an inherent peak and a high-temperature peak appear as endothermic peaks on a first DSC curve obtained by heating 2 to 4 mg of a specimen cut out of the expansion-molded article to 220° C. at a heating rate of 10° C./min by means of a differential scanning calorimeter, and only an inherent peak appears on a second DSC curve obtained by cooling the specimen from 220° C. to about 40° C. at a cooling rate of 10° C./min and heating it again to 220° C. at a heating rate of 10° C./min.

7. The shock-absorbing material according to claim 6, wherein a difference between the temperature corresponding to the top of the high-temperature peak appearing on the first DSC curve and the temperature corresponding to the top of the inherent peak appearing on the second DSC curve is at least 5° C.

8. The shock-absorbing material according to claim 1, wherein the density of the shock-absorbing material is 0.02 to 0.3 g/cm³.

9. The shock-absorbing material according to claim 1, wherein the shock-absorbing material is a core material for automotive bumpers.

10. The shock-absorbing material according to claim 1, wherein the shock-absorbing material is obtained by using foamed particles having a bulk density of at least 0.04 g/cm³.

11. The shock-absorbing material according to claim 1, wherein the foamed particles are obtained by expanding particles of the base resin, with an inorganic gas foaming agent.

12. The shock-absorbing material according to claim 1, wherein the expansion-molded article has compression stress of 7.28 to 7.73 kgf/cm$^2$ and an energy absorption efficiency of 72.4 to 75.4%.

13. A shock-absorbing material composed of an expansion-molded article produced by using foamed particles comprising, as a base resin, only a polypropylene homopolymer obtained by using a metallocene polymerization catalyst or foamed particles comprising, as a base resin, a blend of a polypropylene homopolymer obtained by using a metallocene polymerization catalyst, as a main component, with another resin or elastomer, wherein the base resin has a tensile modulus of at least 15,500 kgf/cm$^2$, the expansion-molded article has a crystal structure so that an inherent peak and a high-temperature peak appear as endothermic peaks on a DSC curve obtained by the differential scanning calorimetry of the molded article, said high-temperature peak meaning a peak appeared on the temperature side higher than a temperature corresponding to the inherent peak of endothermic peaks on a DSC curve obtained by heating 2 to 4 mg of a specimen cut out of the expansion-molded article to 220° C. at a heating rate of 10° C./min by means of a differential scanning calorimeter, and a quantity of heat at the high-temperature peak is at least 30 J/g, compression stress of at least 7.28 kgf/cm$^2$ and energy absorption efficiency of at least 72.4%.

14. The shock-absorbing material according to claim 13, wherein the base resin is composed of only a polypropylene homopolymer obtained by using a metallocene polymerization catalyst.

15. The shock-absorbing material according to claim 13, wherein the base resin is composed of a blend of a polypropylene homopolymer obtained by using a metallocene polymerization catalyst, as a main component, with another resin or elastomer.

16. The shock-absorbing material according to claim 13, wherein the expansion-molded article has a crystal structure so that an inherent peak and a high-temperature peak appear as endothermic peaks on a first DSC curve obtained by heating 2 to 4 mg of a specimen cut out of the expansion-molded article to 220° C. at a heating rate of 10° C./min by means of a differential scanning calorimeter, and only an inherent peak appears on a second DSC curve obtained by cooling the specimen from 220° C. to about 40° C. at a cooling rate of 10° C./min and heating it again to 220° C. at a heating rate of about 10° C./min, and wherein a difference between the temperature corresponding to the top of the high-temperature peak appearing on the first DSC curve and the temperature corresponding to the top of the inherent peak appearing on the second DSC curve is at least 5° C.

17. The shock-absorbing material according to claim 13, wherein the density of the shock-absorbing material is 0.04 to 0.3 g/cm$^3$.

18. The shock-absorbing material according to claim 13, wherein the expansion-molded article has compression stress of 7.28 to 7.73 kgf/cm$^2$ and an energy absorption efficiency of 72.4 to 75.4.

\* \* \* \* \*